(No Model.)

G. F. EBERHARD.
HARNESS TRIMMING.

No. 334,006. Patented Jan. 12, 1886.

WITNESSES
Geo. F. Robinson
W. H. Beeh

INVENTOR
George F. Eberhard
By his Attorney
Bradford Howland

UNITED STATES PATENT OFFICE.

GEORGE F. EBERHARD, OF CLEVELAND, OHIO.

HARNESS-TRIMMING.

SPECIFICATION forming part of Letters Patent No. 334,006, dated January 12, 1886.

Application filed March 30, 1885. Serial No. 160,536. (No model.)

*To all whom it may concern:*

Be it known that I, GEORGE F. EBERHARD, a citizen of the United States, residing at the city of Cleveland, in the county of Cuyahoga and State of Ohio, have invented a new and useful Improvement in Harness-Findings, of which the following is a specification.

My invention consists of a drop pad-hook formed of two parts cast separately, one of the parts being the hook formed with an annular recess or bearing, and the other being the fastening-plate, adapted to receive and cover the recessed end of the hook, as hereinafter more particularly described.

Figure 1:
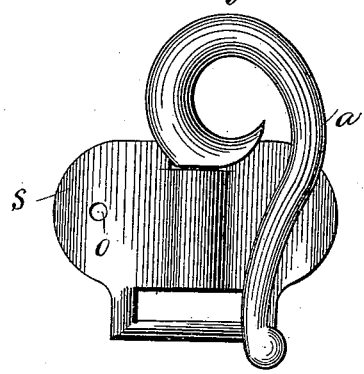
Figure 2:
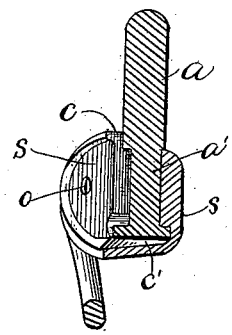
Figure 4:
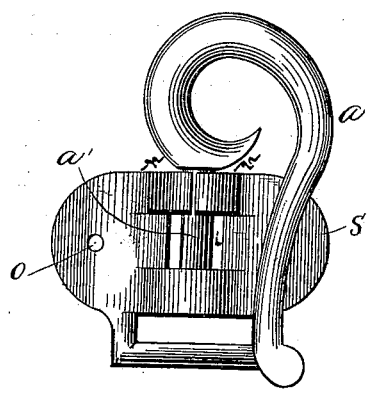
Figure 3:
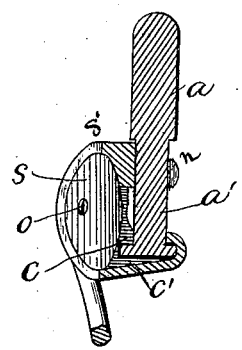

In the drawings forming a part of this specification, Figure 1 is a plan of the hook and plate together, and Fig. 2 is a vertical section of the same. Figs. 3 and 4 are similar views of a modified form of my newly-invented device herein described.

The hook $a$ is formed with an annular recess, $a'$, by means of which it is retained and permitted to turn from side to side in its bearings in plate $s$. This plate is cast with a recess, $c$, in its under side, having an enlargement at $c'$, to receive and be fitted by the recessed end of the hook. It is also formed with rivet-holes $o$, through which it is to be fastened to the back-band of a harness-pad, either with or without an intermediate thin metal plate, as may be preferred.

In the modified form of my device shown in Figs. 3 and 4 the front of recess $c$ is closed at the bottom of plate $s$ at $s'$, forming a bearing for the under side of hook $a$. The upper side of plate $s$ is open across the recess at $i$, in front of which the top of the plate is slit at $e$, forming lips $n$ $n$. The hook and plate are cast separately, and in putting them together the lips $n$ $n$ are to be bent apart to admit the recessed part of hook $a$, and then bent together again to form a bearing for the hook.

In both forms of construction herein described the end of the hook connected with the plate is covered by the latter.

I claim as my invention—

1. A drop pad-hook for harness, consisting of a hook formed with an annular recess or bearing, and a plate formed with a recess in its under side to receive and cover the bearing end of the hook, substantially as described.

2. The hook $a$, formed with the bearing $a'$, in combination with the plate $s$, formed with lips $n$ $n$, and a recess, $c$, covering the bearing end of the hook and closed at $s'$, substantially as described.

GEO. F. EBERHARD.

Witnesses:
W. P. CHASE,
T. R. BECKWITH.